(12) United States Patent
Hunter et al.

(10) Patent No.: US 8,664,576 B2
(45) Date of Patent: Mar. 4, 2014

(54) VEHICLE FOR LAUNCHING FROM A GAS GUN

(71) Applicant: Quicklaunch, Inc., Carmel, CA (US)

(72) Inventors: John William Hunter, Escondido, CA (US); Harry E. Cartland, Carmel, CA (US); Philip James Sluder, El Cajon, CA (US); Richard Edward Twogood, Dublin, CA (US)

(73) Assignee: Quicklaunch, Inc., Monterey, CA (US)

( * ) Notice: Subject to any disclaimer, the term of this patent is extended or adjusted under 35 U.S.C. 154(b) by 0 days.

(21) Appl. No.: 13/963,893

(22) Filed: Aug. 9, 2013

(65) Prior Publication Data

US 2013/0319212 A1      Dec. 5, 2013

Related U.S. Application Data

(63) Continuation of application No. 13/430,678, filed on Mar. 26, 2012, now Pat. No. 8,536,502, which is a continuation of application No. PCT/US2010/050441, filed on Sep. 27, 2010.

(60) Provisional application No. 61/277,544, filed on Sep. 25, 2009, provisional application No. 61/277,543, filed on Sep. 25, 2009.

(51) Int. Cl.
| | |
|---|---|
| *F42B 10/02* | (2006.01) |
| *F42B 10/26* | (2006.01) |
| *F42B 15/10* | (2006.01) |
| *F42B 10/00* | (2006.01) |
| *F42B 15/00* | (2006.01) |

(52) U.S. Cl.
USPC ........... 244/3.23; 244/1 R; 244/3.1; 244/3.21; 244/3.22; 244/3.24; 244/117 R; 244/119; 244/121; 244/158.1; 244/171.7; 89/1.11

(58) Field of Classification Search
USPC ............. 244/159.1, 3.1–3.3, 1 R, 117 R, 119, 244/121, 158.1, 158.9, 171.1, 171.7; 89/1.11, 1.1, 1.8, 1.801, 1.809, 1.816, 89/1.818, 8, 14.05, 14.6, 37.01, 42.01, 89/423.01; 102/374–381, 473, 501, 517, 102/518, 520–528; 124/56, 60; 60/200.1, 60/233, 242; 42/76.01, 76.02; 114/20.1, 114/238, 239; 73/167; 425/77; 451/463, 451/464, 470, 478
See application file for complete search history.

(56) References Cited

U.S. PATENT DOCUMENTS

| | | | | |
|---|---|---|---|---|
| 2,380,317 A | * | 7/1945 | Kline et al. .................... | 451/478 |
| 2,993,412 A | * | 7/1961 | Goldsmith ................... | 89/1.801 |
| 3,131,597 A | * | 5/1964 | Smith et al. ......................... | 89/8 |
| 3,245,318 A | * | 4/1966 | Finkelstein et al. ......... | 89/1.809 |
| 3,384,323 A | * | 5/1968 | Gilbert et al. ................. | 244/169 |
| 3,427,648 A | * | 2/1969 | Manning et al. .............. | 102/523 |
| 3,453,960 A | * | 7/1969 | Qualls .......................... | 102/378 |

(Continued)

*Primary Examiner* — Bernarr Gregory
(74) *Attorney, Agent, or Firm* — K&L Gates LLP (57) ABSTRACT

A vehicle for launching from a gun such as a gas gun and having a housing; preferably incorporating a precessional attitude control system; and utilizing a flared base, fins, or active use of the attitude control system during passage through the atmosphere. Subtly canting the fins can produce desired spinning of the vehicle. The propulsion system can employ liquid, hybrid, or solid fuel. A removable aero-shell assists atmospheric flight with thermal protection being provided by anticipated ablation, an ablative aero-spike, or transpirational cooling. And a releasable sabot enhances the effectiveness of the launch.

26 Claims, 6 Drawing Sheets

Vehicle with sabot

(56) References Cited

U.S. PATENT DOCUMENTS

| | | | |
|---|---|---|---|
| 3,597,969 A * | 8/1971 | Curchack | 73/167 |
| 3,665,861 A * | 5/1972 | Jaslow | 102/522 |
| 3,706,281 A * | 12/1972 | Hatakeyama | 102/378 |
| 3,714,900 A * | 2/1973 | Feldmann | 102/522 |
| 3,738,279 A * | 6/1973 | Eyre et al. | 102/521 |
| 3,750,578 A * | 8/1973 | Blajda | 102/520 |
| 3,759,184 A * | 9/1973 | Blajda et al. | 102/520 |
| 3,769,912 A * | 11/1973 | Friend | 102/522 |
| 3,771,458 A * | 11/1973 | Schweimler et al. | 102/523 |
| 3,780,658 A * | 12/1973 | de Longueville et al. | 102/518 |
| 3,802,345 A * | 4/1974 | La Costa | 102/522 |
| 3,834,314 A * | 9/1974 | Young | 102/521 |
| 3,905,299 A * | 9/1975 | Feldmann | 102/522 |
| 4,038,903 A * | 8/1977 | Wohlford | 89/8 |
| 4,049,367 A * | 9/1977 | Tominaga et al. | 425/77 |
| 4,181,152 A * | 1/1980 | Nicoloff | 114/238 |
| 4,284,008 A * | 8/1981 | Kirkendall et al. | 102/521 |
| 4,314,510 A * | 2/1982 | Jeter et al. | 102/523 |
| 4,434,718 A * | 3/1984 | Kopsch et al. | 102/522 |
| 4,669,212 A * | 6/1987 | Jackson et al. | 42/76.02 |
| 4,702,027 A * | 10/1987 | Stanley | 42/76.02 |
| 4,709,638 A * | 12/1987 | Broden et al. | 102/522 |
| 4,800,816 A * | 1/1989 | Meyer | 102/523 |
| 4,886,223 A * | 12/1989 | Gartner | 244/3.23 |
| 4,982,669 A * | 1/1991 | Bisping et al. | 102/520 |
| 5,012,744 A * | 5/1991 | Sowash | 102/523 |
| 5,165,041 A * | 11/1992 | Bjerke et al. | 102/520 |
| 5,167,386 A * | 12/1992 | Laquer et al. | 244/121 |
| 5,404,816 A * | 4/1995 | Burri | 102/523 |
| 5,481,980 A * | 1/1996 | Engel et al. | 102/521 |
| 5,666,897 A * | 9/1997 | Armstrong | 114/20.1 |
| 5,966,858 A * | 10/1999 | Curtis et al. | 89/14.6 |
| 6,086,020 A * | 7/2000 | Machiussi | 244/173.1 |
| 6,116,136 A * | 9/2000 | Kirschner et al. | 89/43.01 |
| 6,234,082 B1 * | 5/2001 | Cros et al. | 102/520 |
| 6,257,527 B1 * | 7/2001 | Redding et al. | 244/159.1 |
| 6,298,786 B1 * | 10/2001 | Grosskrueger et al. | 102/378 |
| 6,494,406 B1 * | 12/2002 | Fukushima et al. | 244/173.3 |
| 6,530,543 B2 * | 3/2003 | Redding et al. | 244/159.1 |
| 6,536,350 B2 * | 3/2003 | Cartland et al. | 102/374 |
| 6,685,141 B2 * | 2/2004 | Penn | 244/171.1 |
| 7,526,988 B2 * | 5/2009 | Elder | 244/3.24 |
| 7,775,148 B1 * | 8/2010 | McDermott | 89/1.809 |
| 8,519,312 B1 * | 8/2013 | Merems | 244/3.1 |
| 2008/0257192 A1 * | 10/2008 | Schaeffer | 102/522 |
| 2009/0211225 A1 * | 8/2009 | Nyberg et al. | 60/242 |

\* cited by examiner

Figure 1. Vehicle with sabot

Figure 2. Vehicle aero-shell

Figure 3. Rocket motor and payload

Figure 4. Rocket nozzle and Attitude Control System (ACS)

Figure 5. Close up of ACS and rocket nozzle

Figure 6. Vehicle seated in launch tube

VEHICLE FOR LAUNCHING FROM A GAS GUN

This application is a Continuation of U.S. patent application Ser. No. 13/430,678, filed Mar. 26, 2012, now U.S. Pat. No. 8,536,502, and entitled "Vehicle For Launching From A Gas Gun," inventors John Hunter, Harry Cartland, Philip Sluder, and Richard Twogood, which is a continuation of PCT/US2010/050441, filed Sep. 27, 2010 and entitled "Vehicle for Launching from a Gas Gun," inventors John Hunter, Harry Cartland, Philip Sluder, and Richard Twogood, which claims priority to U.S. App. 61/277,544 and U.S. App. 61/277,543, each of which was filed Sep. 25, 2009. Each of the four preceding applications is incorporated by reference herein as if put forth in full below.

TECHNICAL FIELD

This invention relates to a vehicle such as a missile or rocket having the capability for self-propulsion but receiving its initial acceleration from being launched by a gas gun.

BACKGROUND ART

Projectiles launched from gas guns are known to use sabots.

The inventors of the present invention are, however, unaware of any missiles launched from a gas gun which employ an aero-shell, technology to protect the missile from heat generated during the missile's movement through the atmosphere, spinning and pulsed propulsive bursts from the missile to control the direction of the missile, oversized propellant or oxidizer tanks to be used for delivery of propellant or oxidizer, or moving surfaces to induce lift during the portion of the missile's flight within the atmosphere.

The present inventors have developed a means of delivering supplies to earth or lunar orbit in order to assist space exploration. The current method of delivering propellant, food and other supplies to orbit is with rocket delivery. Rocket delivery is extremely expensive with a typical cost of about $5,000 per lb of payload delivered. The requirement for approximately 9 km/s delta V to attain earth orbit when coupled with the rocket equation yields only a few percent payload fraction for rocket delivery. Their method uses a hydrogen gas gun to first boost a rocket to high speed. This allows a smaller more efficient rocket to deliver the payload to orbit. The payload fractions obtained are thereby much higher than obtained by a rocket alone. Their higher payload fractions plus the re-usable hydrogen gas gun reduce the payload delivery cost by more than a factor of 10.

The present inventors have previously described using hydrogen gas guns to deliver payloads to orbit in the following published articles: "Livermore Proposes Light Gas Gun For Launch of Small Payloads", *Aviation Week and Space Technology*, Jul. 23, 1990, pp. 78-80; "*Shooting Right For The Stars With One Gargantuan Gas Gun*", Smithsonian Magazine, January 1996, pp. 84-91; and "The Jules Verne Gun", Popular Mechanics, December 1996, pp. 54-57.

DISCLOSURE OF INVENTION

The Vehicle of the present invention utilizes an aero-shell, technology to protect the missile from heat generated during the missile's movement through the atmosphere; spinning and pulsed propulsive bursts from the missile to control the direction of the missile, in one embodiment; oversized propellant or oxidizer tanks to be used for delivery of propellant or oxidizer, in one embodiment; and moving surfaces to induce lift during the portion of the missile's flight within the atmosphere, in one embodiment.

Figure 1:
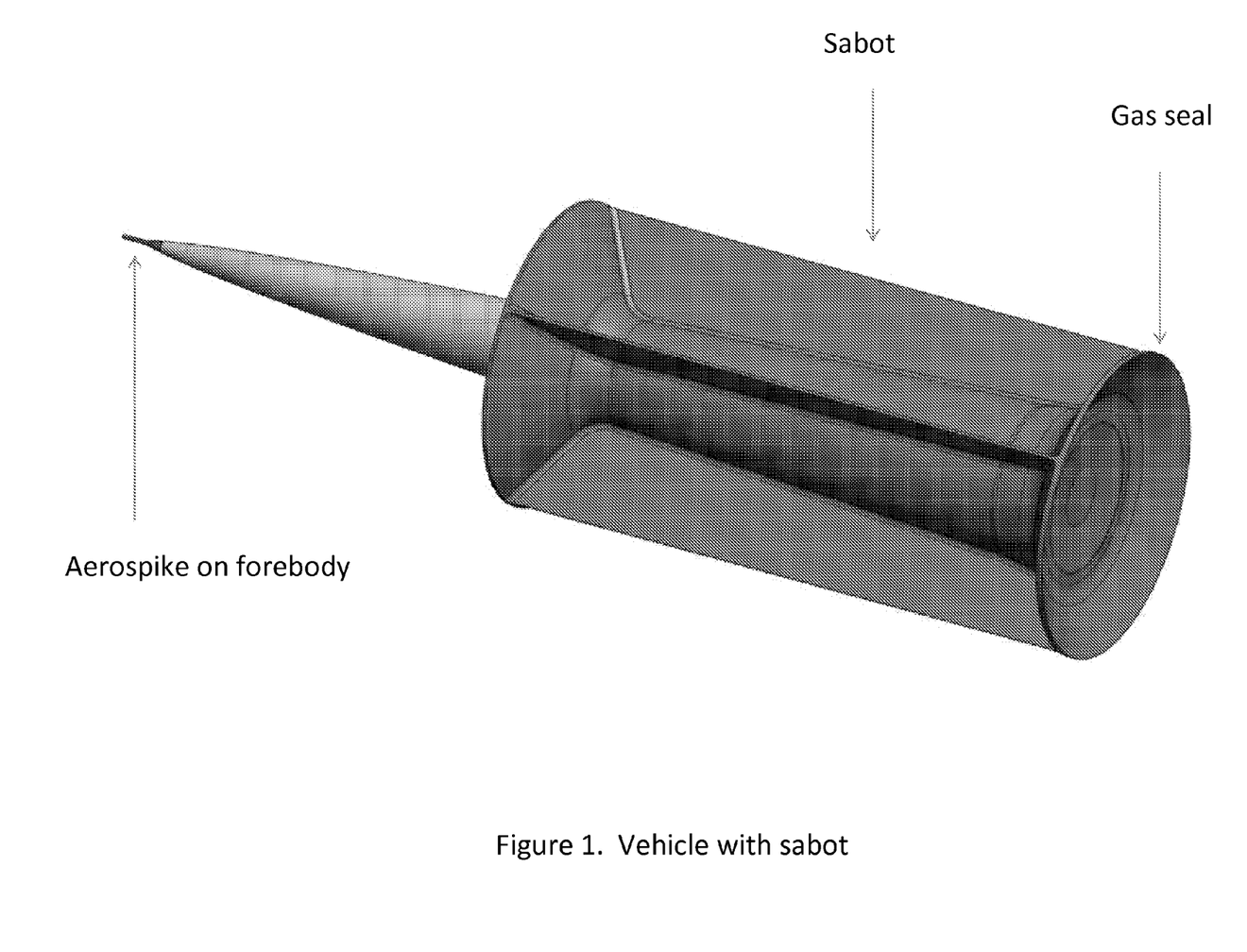
FIG. 1 shows the launch vehicle with sabot.

The launch vehicle has the following objects and advantages:

1. It has a sabot as shown in FIG. 1 that allows a larger working area for the hydrogen pressure. This gives the vehicle greater velocity for a given hydrogen pressure.

2. It has a sacrificial aero-spike at the nose to reduce the heat transfer on the forward part of the vehicle. The aero-spike will ablate several inches during atmospheric flight. The advantage is the aero-shell fore-body is substantially away from the high speed air stagnation point at the aero-spike tip and hence will not heat and ablate excessively.

3. It preferably spins about the long axis thereby averaging out aerodynamic moments and heating. This reduces peak bending forces and hot spots.

Figure 2:
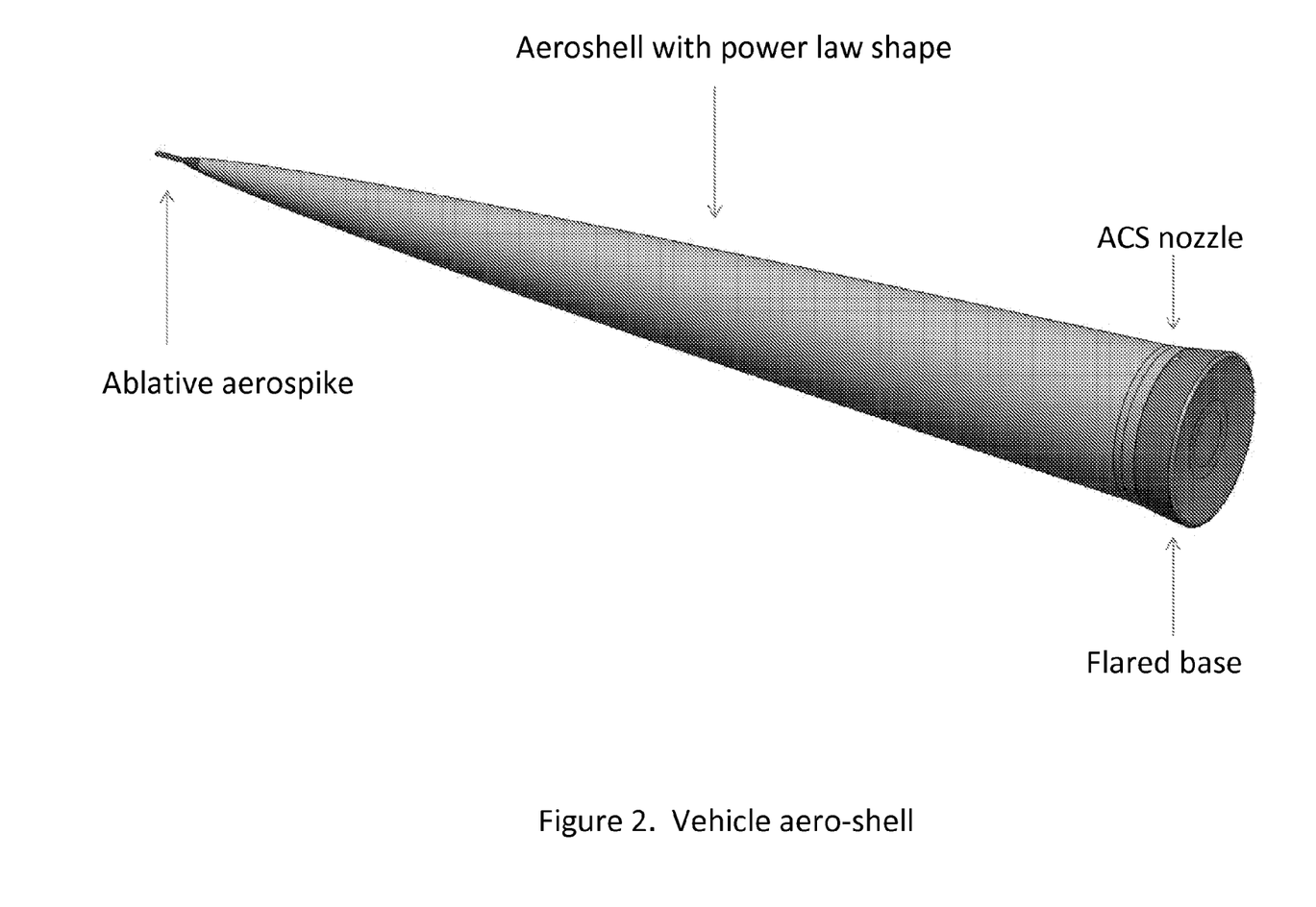
FIG. 2 shows the vehicle aero-shell.
Figure 4:
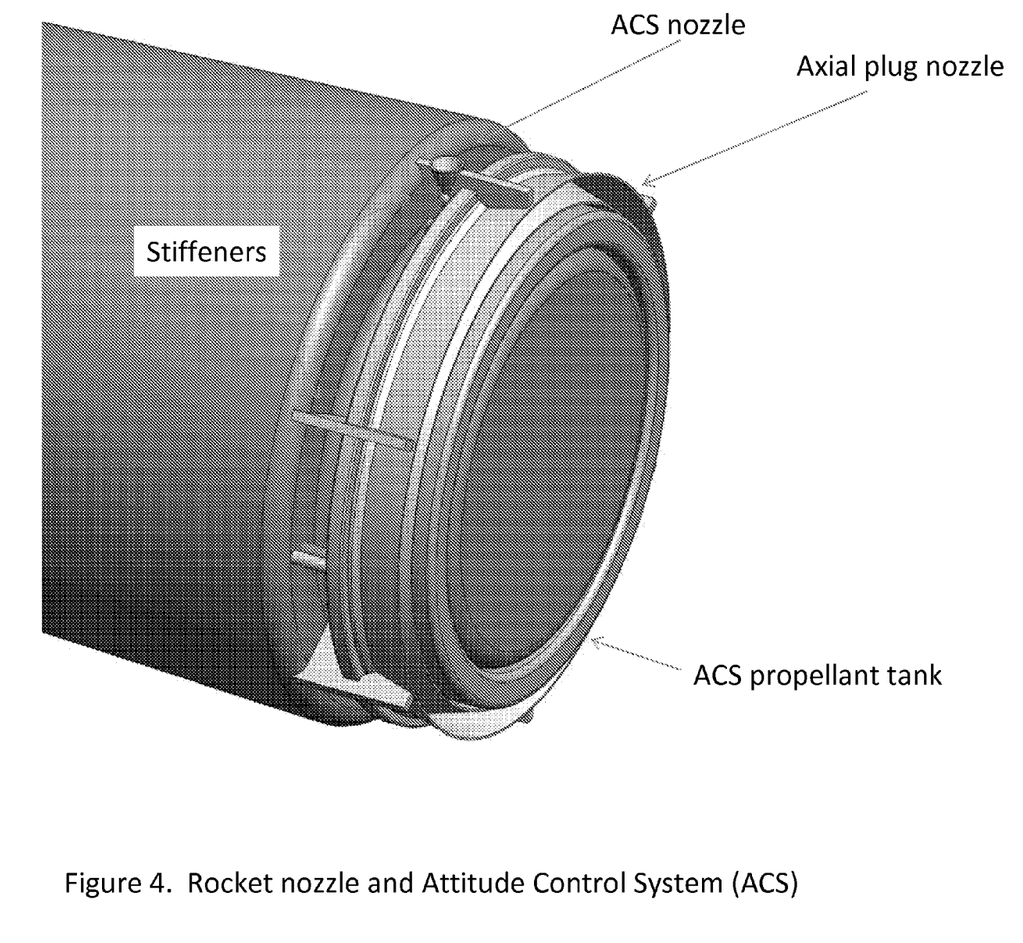
FIG. 4 shows the axial plug nozzle as well as an ACS and its small radially directed rocket nozzle.
Figure 5:
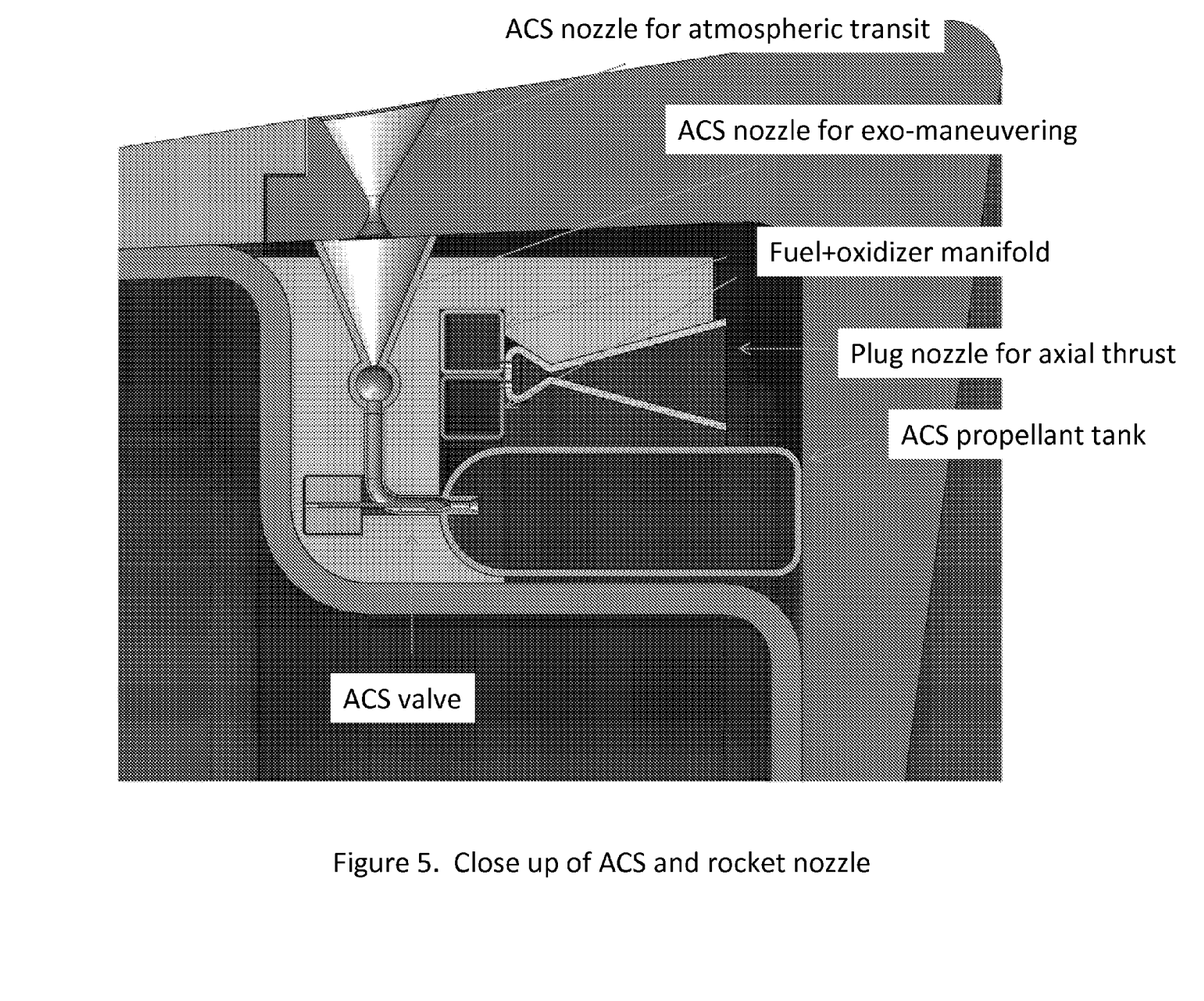
FIG. 5 shows a close up of the plug nozzle and the ACS.

4. It preferably has an Attitude Control System (ACS) that only requires one nozzle. The ACS includes sensors; an intelligent microprocessor-based controller; a small propellant tank; and a single, rapidly responsive rocket motor as shown in FIGS. 2, 4, and 5. The single nozzle pulsing at right angles to the vehicle cause the spinning vehicle to precess to the desired orientation. The advantage is a much lower part count and weight than a traditional ACS which usually has multiple nozzles.

5. It preferably has propellant tanks that can carry both the propellant and the payload. This is because the payload is often rocket propellant such as $LH_2$, LOX or RP1, while the vehicle uses the same propellant. This will reduce the part count and weight of the vehicle.

6. It preferably has a plug nozzle. The advantage is a much shorter, compact nozzle than a conventional central nozzle. This will increase ruggedness under the high G launch loads. It will also allow for a more compact and lighter vehicle.

7. It preferably has a centripetal fuel pump based on vehicle rotation. The rapidly spinning vehicle can generate significant hydrostatic propellant pressures at the periphery of the propellant tanks. Propellant can then be fed through a pressure regulator to the plug nozzle. The advantage is in eliminating a turbo-pump or pressure bottle that is ordinarily used to pressurize the propellant. This will save weight and reduce cost.

8. It preferably has liquid propellant comprised of an oxidizer and a fuel. One advantage is no in-bore detonations in the event of vehicle break up in the launcher. Other advantages include higher specific impulse as well as the ability to throttle thrust.

9. It obtains a large amount of initial velocity from gun launch. This reduces the amount of propellant needed and results in higher payload fraction to orbit than conventional rocket delivery.

MODES FOR CARRYING OUT THE INVENTION

The launch vehicle, illustrated in FIGS. 1 through 6, has a sabot that encloses the aero-shell and gives it an effectively larger area. The sabot is preferably composed of at least two petals, even more preferably of two to six petals, and most preferably of four petals. The petals are a composite or aluminum and fall off of the aero-shell when the vehicle emerges from the launcher and encounters aerodynamic forces.

The aero-shell preferably has a power law shape of the form $r=AX^P$ where the exponent is 0.75, although other viable shapes such as bi-conic exist. The acceptable range of exponent is, though, between 0.25 and 1.5, inclusive. The length to diameter ratio L/D is between 3 and 20, exclusive of the endpoints. An L/D of 5 has about 4 times the drag of an L/D of 10. The reason for excluding L/Ds greater than or equal to 20 is the fragility of long skinny objects at extreme speeds in air. Conversely, an L/D of 1, will be rugged but have unacceptably high drag.

The aero-shell covers the housing of the vehicle without, of course, blocking the rocket motor nozzle, and is composed of carbon-phenolic or similar and has a wall thickness appropriate to the in-bore stresses it will experience. (Carbon-phenolic is a name known by one of ordinary skill in the field of thermal protection for aircraft and reentry bodies.) In-bore stresses are a result of base pressure, velocity, barrel Straightness, and vehicle/sabot material. Those of ordinary skill in the art who design vehicles, e.g., designers for the light gas gun at AEDC in Tennessee, use computer FEA (Finite Element Analysis) predictions to design hypersonic gun-launched vehicles based on those properties. In addition to using computer programs to determine wall thickness, it is desirable to take data from a large number of test launches to validate and augment the FEA results.

The fore-body is preferably capped with an ablative aero-spike as illustrated in FIG. 2, although other nose-protection schemes don't use an aero-spike but accept a certain level, such as 5 to 10 inches, of nose ablation. And optionally the nose is cooled by transpiration, wherein a fluid such as water is forced through holes in the nose of aero-shell and other areas where thermal protection is desirable. The aero-spike is made of a rugged high Q* material like carbon-carbon or oak. It is approximately 1" in diameter and 10 inches long. (Aero-spike length varies depending on vehicle size and velocity. For the figures given here the inventors have assumed a 1-meter diameter aero-shell and a velocity of 6 km/s).

Q* refers to the heat of ablation of a material under extremely high heating rates consistent with orbital speeds. Carbon-Carbon is known to those of ordinary skill in the field of thermal protection for re-entry vehicles. For example, Teflon®, Carbon-Carbon, and oak are among acceptable ablative TPS (Thermal Protection System) materials. Carbon-Carbon has a Q* in excess of 5,000 Btu/lb or 1.2e7 joules/kg. PICA (Phenolic Impregnated Carbon Ablator) and PICA-X are recent acceptable coatings used by NASA and Space X.

Aero-spike dimensions and length can be computed by the use of ablation codes such as Coyote and ABRES (ASCC86) at Sandia National Laboratories. Don Potter at SANDIA's Aeroscience and Compressible Fluid Mechanics Department, has run his shape changing ablation codes for the inventors in the past to predict the shape of an ablated vehicle nose. This is a straightforward yet challenging piece of engineering. There will be some trial and error. There are probably several hundred individuals of ordinary skill in the field at SANDIA, LLNL, Los Alamos, NASA, and assorted companies like SpaceX, Boeing and Lockheed who can perform the work. There will be some testing required in addition to the simulations.

The aft section of the vehicle preferably has a flared base in order to move the center of pressure rearward to increase stability. An ACS (Attitude Control System) nozzle, shown in FIGS. 2, 4, and 5, is preferably near the base in order to help provide stability during atmospheric transit. In addition, subtly canted (preferably less than five degrees with reference to the longitudinal axis of the vehicle because of the extreme speeds, heating rates, and dynamic pressures experienced by the vehicle in the atmosphere) fins are optionally present near the base to provide spin.

An aero-shell ejection charge, illustrated in FIG. 2, is located near the tip of the vehicle. Timing can be determined by an on-board accelerometer that determines when the vehicle has obtained approximately 60 to 100 km altitude or more. The first actuator is shown at the nose in order to push the motor and payload out of the hot aero-shell. There will be other actuators including exploding bolts and cutting charges required to sever internal structures to free the motor and payload from the aeroshell. These other actuators will be fired prior to the actuator on the nose which ejects the motor and payload.

When the vehicle is powered by a solid propellant, a cargo compartment will exist. This is also an option when the vehicle uses liquid propellant.

Figure 3:
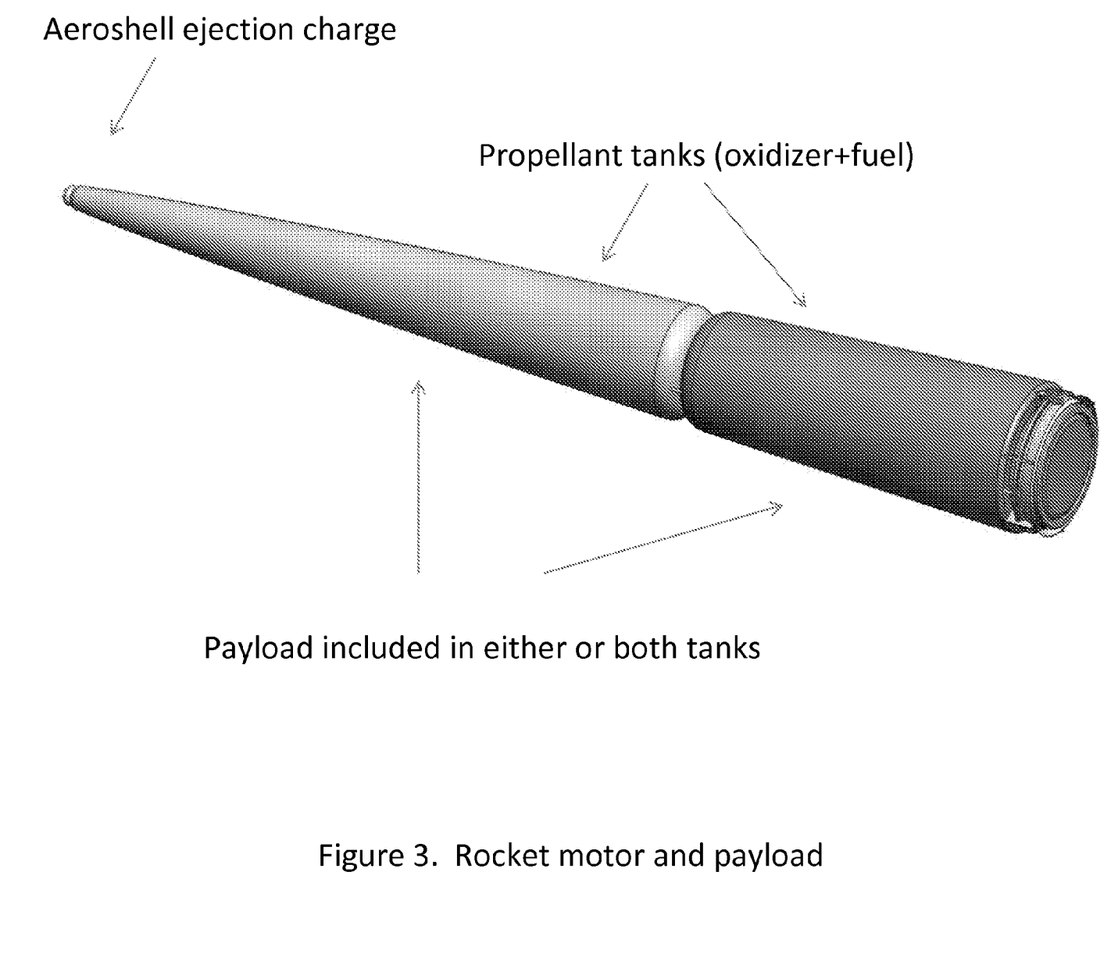
FIG. 3 shows the rocket motor and payload.

More commonly, however, if liquid propellant powers the vehicle, the vehicle contains an oxidizer tank and a propellant tank, as illustrated in FIG. 3, with at least one tank being oversized to carry additional oxidizer or additional propellant as cargo. Instead of, or in addition to, an oversized tank, a third tank optionally exists in order to carry liquid cargo other than an oxidizer or propellant, such as water or xenon.

A standard liquid propellant is most preferred, a hybrid fuel is preferred, and solid fuel is the third in terms of priority of propellants. Hybrid rockets use a fuel such as acrylic, polyethylene or polybutadiene and then flow a gaseous oxidizer like oxygen or nitrous oxide over the fuel surface. They are safer than ordinary solid motors yet still throttleable via the oxidizer. Of course when liquid propellant is utilized, there must be one or more valves to control the propellant and oxidizer; and in a hybrid rocket there must be a valve to control the oxidizer.

Attitude control of the vehicle is possible with a standard nozzle or multiple standard nozzles; preferably, though, a rocket plug nozzle is utilized, as described below and as illustrated in FIGS. 4 and 5.

For either the primary motor or the attitude control system motor a manifold and igniter exist unless the propellant is hypergolic, in which case an igniter is unnecessary. In the case of the rocket plug nozzle the manifold is located near the plug nozzle and regulates and distributes the propellant which is pressurized preferably from centripetal force created by spinning the vehicle. The propellant can be extracted near the periphery where the pressure will be the greatest.

The propellant will be extracted at the maximum diameter for the tanks, which are preferably tapered. The centripetal force/pressure will be greatest there. (There may be some issue with spinning a liquid since this can lead to a "flat spin" due to dissipation; however, there are realistic solutions, such as gelling or freezing the liquid or incorporating baffles.) The inventors prefer using the rapid spin to pressurize the propellant as it is novel and should eliminate a turbopump or pressurization tank, which will produce significant weight and cost savings. A traditional approach is to use a turbopump, an internal combustion engine pump, or a gas, usually helium, pressurant. Another novel method is to employ a heat sink that taps the aero-shell heat during egress and later transfers the heat to the propellant, thereby vaporizing and pressurizing it.

The inventors still prefer the spinning liquid centripetal pump, even though it will require substantial engineering and testing.

The ACS nozzle of FIG. 5 penetrates the aero-shell. After the aero-shell is discarded along with the exterior ACS nozzle, the interior ACS nozzle is exposed for maneuvers in the vacuum of space.

FIG. 5 shows the annular ACS monopropellant tank is located inward of the plug nozzle. FIG. 5 is a cutaway. As best seen in FIG. 4, the plug nozzle and the ACS tank are distributed over the full 360 degrees. As shown in FIG. 5, the exhaust impinging on the ACS tank as shown can be problematic. Preferably, the plug nozzle is directed inward, preferably substantially 20 degrees inward; and the inner part of the nozzle extends below the ACS tank.

The ACS is controlled by a microprocessor and sensor package (not shown since these are traditional elements). The sensors include an accelerometer, a GPS, a radio transmitter and receiver, a horizon sensor, and a payload integrity sensor. One of ordinary skill in the art would understand control of the ACS system. This includes employees of Ball Aerospace, Boeing, Lockheed-Martin etc. who regularly maneuver satellites.) The sensor package preferably uses a combination of GPS and inertial guidance, plus active radio telemetry with the propellant station. This is discussed more on page 3 of the vehicle patent. The Russian's Progress resupply vehicle use an autonomous docking system comprised of the TsVM-101 digital flight computer plus the MBITS digital telemetry system. In 2007 DARPA also demonstrated autonomous docking with Orbital Express. DARPA used AVGS (Advanced Video Guidance System) to guide the docking.

The microprocessor controller is capable of repetitively pulsing the small rocket motor shown in FIG. 5.

The operation of the Gas Gun Launcher is as follows:

The launch facility first scans the area down range with radar and visually to insure range safety.

The gun is cleaned and prepared to accept the vehicle.

Figure 6:
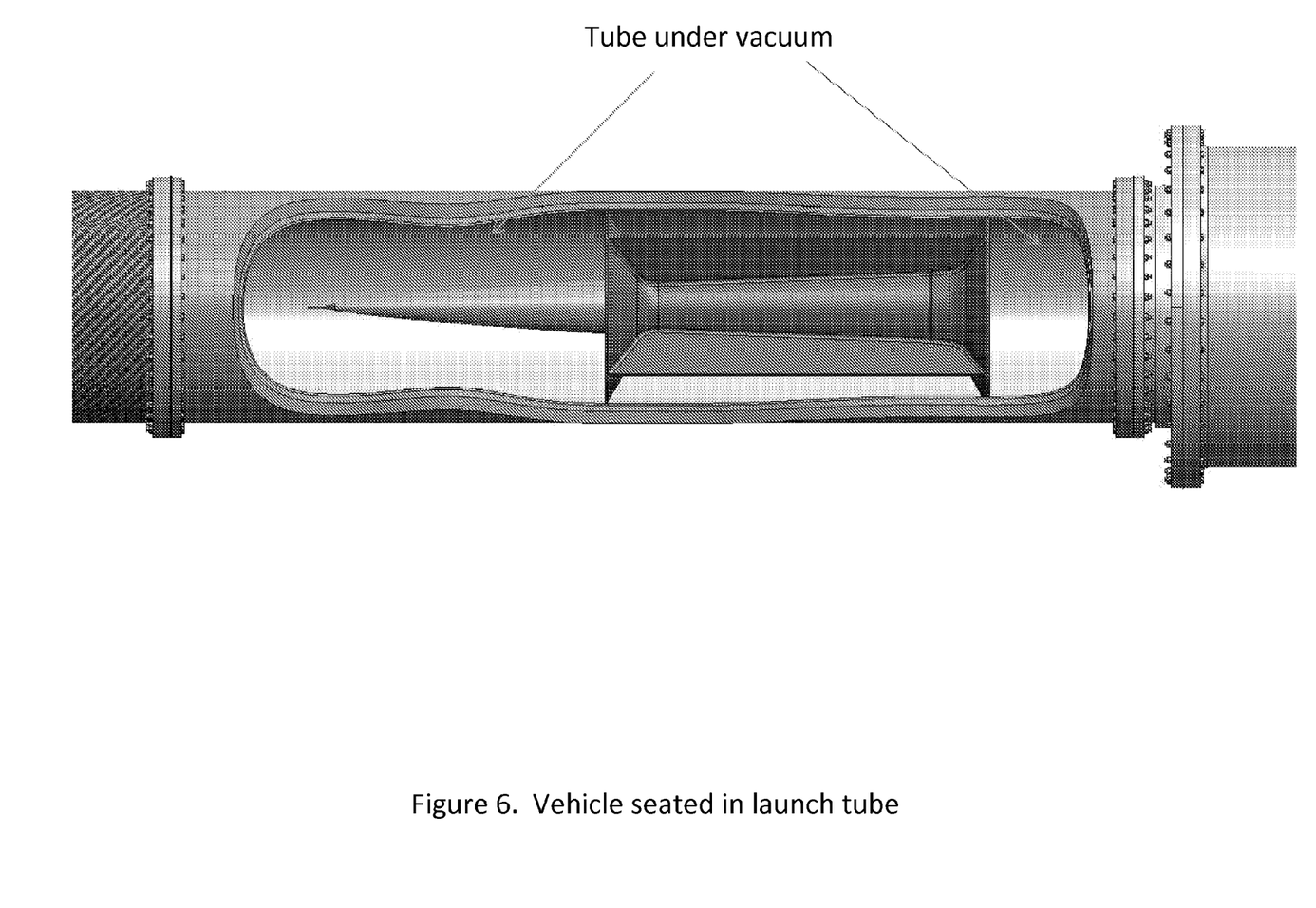
FIG. 6 shows the launch vehicle inside the gun before launch.

Next the launch vehicle is loaded with propellant and payload and inserted down the launch tube from the muzzle until it seats near the pump tube (and the sliding seal in the OBL) as in FIG. 6. If the propellant is cryogenic, then propellant may be vented and topped off as needed by thin tubing penetrations that reach the vehicle from outside the launch tube.

From this point on the system is operated remotely.

A vacuum of a few Torr is pulled separately in both the launch tube and pump tube. Care must be taken to maintain lower pressure behind the projectile so that it does not get pushed toward the muzzle. The gun is energized and prepared for launch.

The tracking radars are notified and the gun is fired. The vehicle is accelerated down the launch tube to high speed and pushes a small amount of shocked air in front like a snowplow. The shocked air impacts a diaphragm, preferably composed of MYLAR, at the muzzle and blows it outward allowing the vehicle to exit the gun unscathed.

The vehicle emerges from the muffler and the sabot petals are lifted away from the aero-shell by aerodynamic forces. The petals burn because of air friction due to the high speed of the vehicle while airborne and land within a few km of the muffler. The vehicle is either spinning on exiting the launch tube or spins up in the atmosphere due to the subtly canted fins. Vehicle orientation changes are made if needed by driving gyroscopic precession. The angular precession rate is given by:

$$\text{Angular Rate} = \text{Torque}/\text{Angular momentum} \quad \text{(Eqn. 2)}$$

(Here torque is applied at right angles to the angular momentum axis. See "The Furman Lectures on Physics" Vol. 1 Chapter 20, p. 6, Eqn. 20.15.)

The preferred ACS has a major novel feature in that it achieves orientation via stroboscopically applying thrust at right angle to the spin axis of the vehicle in accordance with Eqn. 2 above. This is important and different. Alternatively we can use conventional ACS thrust maneuvers which don't require a spinning vehicle, but they do require more thrusters. (Conventionally 2 thrusters for pitch and 2 for yaw located near the nose, as well as 2 for roll located near the center of mass.)

Spinning the vehicle can be performed several ways. The fins will be very small canted protuberances on the aft section. They will not stick out more than say 5% of the vehicle diameter, and are expected to have a cant angle of 1 degree<theta<5 degrees. Their length can be 5-100% of the vehicle diameter. Optionally, grooves similarly oriented on the surface of the vehicle can be employed. And alternatively, the inventors believe a practical technique is pre-spinning the vehicle in the launcher prior to launch by spinning the section of launch tube containing the vehicle. The other option is to hone the barrel preferentially in one direction. Of the three techniques, pre-spinning the vehicle is likely the most precise. The fin option however, has a side benefit in that it will stabilize the projectile both gyroscopically as well as by moving the center of pressure aft of the center of gravity. All of these methods can be accomplished by one skilled in the art; however, significant engineering and testing will be required.

Eqn. 2 is more transparent here: Dtheta=Dt*Force*(length to center of mass)/Angular momentum, with "Force" being that force applied by the ACS single thruster as it pulses. Sensors determine the orientation of the vehicle so that the microprocessor, or controller, can issue commands to achieve the desired orientation. Naturally there are other sensors onboard to determine where the vehicle is relative to the depot as well as the relative velocity etc. There are also the usual payload integrity sensors etc.

As the vehicle ascends through the atmosphere, the aerospike sees maximum heating and will ablate substantially. The rest of the aero-shell should remain largely undisturbed although the minimal fins may also get ablated somewhat. After attaining approximately 60 to 100 km altitude the aeroshell will be ejected exposing the rocket motor and payload. Shortly thereafter, the rocket is ignited and burns for approximately 100 seconds as it nears the orbital depot. The spinning rocket causes significant centripetal propellant pressure thereby, in the preferred embodiment, circumventing the need for a tank pressurization device or a turbo-pump. With the sensors providing input to the microprocessor, or controller, the ACS knows the vehicle location, velocity, and orientation during and after the rocket burn. It continues to orient the spinning rocket/payload assembly as they approach the depot. The ACS is also in communication with the depot as needed in order to perform final maneuvers.

Upon arriving near the depot a robotic tug fields the rocket/payload assembly. It determines payload integrity and then delivers the rocket/payload assembly to the propellant depot where the propellant is siphoned off. The now empty payload compartment and the rocket assembly are stored for future disposal or recycling.

Alternatives or options in addition to those discussed above are as follows:

The vehicle may be spun up while in the launcher by having a motor spinning the section of launch tube where the vehicle is seated while maintaining a good seal. Another method is to hone the launch tube in a particular direction (say clockwise).

This has been known to impart spin to high speed projectiles. Note that at the speeds under consideration by the inventors (greater than 3 km/s) conventional rifling does not survive the shot.

The vehicle may have movable features that induce lift during atmospheric traversal in order to access different inclination orbits. This is similar to MARV technology for re-entry vehicles.

The liquid propellant may be pressurized via a conventional helium pressure vessel, a turbo-pump, or an internal combustion pump.

The rocket motor may have multiple stages.

The rocket motor may have a conventional central nozzle to provide axial thrust.

The vehicle may use a conventional attitude control system incorporating multiple nozzles.

The vehicle may use solid or hybrid propellant rockets in one or more stages.

The vehicle may have autonomous docking with the depot or satellite.

As used herein, the term "substantially" indicates that one skilled in the art would consider the value modified by such terms to be within acceptable limits for the stated value. Also as used herein the term "preferable" or "preferably" means that a specified element or technique is more acceptable than another but not that such specified element or technique is a necessity.

And non-essential features may be utilized in any and all practical combinations.

INDUSTRIAL APPLICABILITY

The way in which the Vehicle for Launching from Gas Gun is capable of exploitation in industry and the way in which the Vehicle for Launching from Gas Gun can be made and used are obvious from the description and the nature of the invention provided by the foregoing discussion.

What is claimed is:

1. A gun-launched vehicle which comprises:
   an aero-shell configured to be jettisoned during flight;
   within an area defined by said aero-shell, a rocket propulsion system; and
   wherein the vehicle additionally has moving surfaces configured to provide lift during ascent through the atmosphere.

2. A vehicle according to claim 1 and further comprising a payload within the vehicle body covered by said aero-shell.

3. A vehicle according to claim 2 wherein the payload comprises at least one selected from fuel and oxidizer.

4. A vehicle according to claim 3 wherein at least one of the fuel and the oxidizer is contained in an oversize tank.

5. A vehicle according to claim 2 wherein the payload comprises cargo separate from the fuel and the oxidizer.

6. A vehicle according to claim 5 wherein the cargo resides within a chamber within the body.

7. A vehicle according to claim 2 wherein the payload comprises a satellite.

8. A vehicle according to claim 2 wherein the aero-shell has an aerospike positioned at a pointed end of said aero-shell.

9. A vehicle according to claim 2 with the vehicle body further comprising an attitude control system.

10. A vehicle according to claim 9 wherein the attitude control system comprises a rocket nozzle positioned at a side of the vehicle in a position to apply thrust perpendicular to a spin axis of the vehicle.

11. A vehicle according to claim 10 wherein the rocket nozzle is configured to stroboscopically apply thrust.

12. A vehicle according to claim 9 wherein the attitude control system comprises roll thrusters.

13. A vehicle according to claim 2 and further comprising a centripetal pump in fluid communication with a propellant tank of the rocket propulsion system.

14. A vehicle according to claim 13 and said vehicle body further comprising an attitude control system.

15. A vehicle according to claim 14 wherein the attitude control system comprises a rocket nozzle positioned at a side of the vehicle in a position to apply thrust perpendicular to a spin axis of the vehicle.

16. A vehicle according to claim 15 wherein the rocket nozzle is configured to stroboscopically apply thrust.

17. A vehicle according to claim 2 wherein the rocket propulsion system comprises a single plug nozzle.

18. A vehicle according to claim 17 wherein the plug nozzle is in fluid communication with a centripetal pump of the rocket propulsion system.

19. A vehicle according to claim 1 and said vehicle body further comprising an attitude control system.

20. A vehicle according to claim 19 wherein the attitude control system comprises a rocket nozzle positioned at a side of the vehicle in a position to apply thrust perpendicular to a spin axis of the vehicle.

21. A vehicle according to claim 20 wherein the rocket nozzle is configured to stroboscopically apply thrust.

22. A vehicle according to claim 1 and further comprising a centripetal pump in fluid communication with a propellant tank of the rocket propulsion system.

23. A vehicle according to claim 1 and further comprising a releasable sabot enclosing at least a portion of said aero-shell.

24. A gun-launched vehicle and gun in combination, comprising (1) said gun, and (2) said gun-launched vehicle, wherein said vehicle comprises
   an aero-shell configured to be jettisoned during flight;
   within an area defined by said aero-shell, a rocket propulsion system; and
   wherein the vehicle additionally has moving surfaces configured to provide lift during ascent through the atmosphere.

25. A method of launching a vehicle, the method comprising
   accelerating the vehicle using a gun;
   generating lift on the vehicle during launch using lift-generating movable surfaces of said vehicle;
   jettisoning an aero-shell of said vehicle during launch; and
   propelling the vehicle during launch using a rocket.

26. A method according to claim 25 wherein the act of propelling the vehicle using the rocket occurs after the act of jettisoning the aero-shell.

* * * * *